United States Patent [19]
Wood

[11] Patent Number: 5,817,163
[45] Date of Patent: Oct. 6, 1998

[54] ALUMINUM SCRAP CLEANING AND DECARBONIZATION

[76] Inventor: Michael James Wood, 22 Columbus, Irvine, Calif. 92720

[21] Appl. No.: 854,519

[22] Filed: May 12, 1997

[51] Int. Cl.⁶ .................................................. C22B 21/00
[52] U.S. Cl. ............................ 75/403; 75/687; 134/25.1; 134/30; 134/40
[58] Field of Search .................... 75/687, 403; 134/25.1, 134/30, 40

[56] References Cited

U.S. PATENT DOCUMENTS

| 5,405,428 | 4/1995 | Dube et al. | 75/715 |
| 5,597,401 | 1/1997 | Megy | 75/304 |

*Primary Examiner*—Melvyn Andrews
*Attorney, Agent, or Firm*—F. Eugene Logan

[57] ABSTRACT

Aluminum scrap containing a carbon-containing coating is cleaned with about 212° F. hot water, and then decarbonized with about 1000° F. superheated steam which produces a carbon-containing volatile from the carbon-containing coating and a decarbonized aluminum scrap. A spent steam and carbon-containing volatile gaseous mixture at about 212° F. is contacted with a warm water filtrate at a nominal temperature of about 132° F., recovered from the process which causes the spent steam to condensed. The condensate at about 212° F. is separated from the carbon-containing volatile and the latter combusted. The combustion products can be used to preheat indirectly other stream in the process or to dry the decarbonized aluminum scrap at a temperature low enough not to cause oxidation of the aluminum scrap. The decarbonized aluminum scrap and carbon-containing volatile are produced in an essentially combustion-product-gas free environment under a slight negative gauge pressure thereby preventing fugitive emissions. Because the decarbonized aluminum scrap is cleaner and less oxidized than that produced by conventional rotary kiln process, when the aluminum scrap is melted less dross is produced thereby producing a higher aluminum yield. Dross loss is estimated to be reduced from about 9% to about 5% which would result in about $500,000 saving per month for a plant processing 12.5 million lbs. of aluminum scrap per month.

21 Claims, 4 Drawing Sheets

ALUMINUM SCRAP CLEANING AND DECARBONIZATION

BACKGROUND OF THE INVENTION

Conventional processes for decarbonizing aluminum scrap usually involves oxidizing the carbon-containing coating and other combustible materials in rotary kiln in direct contact with hot 1000° F. or higher combustion product gas.

Figure 4:
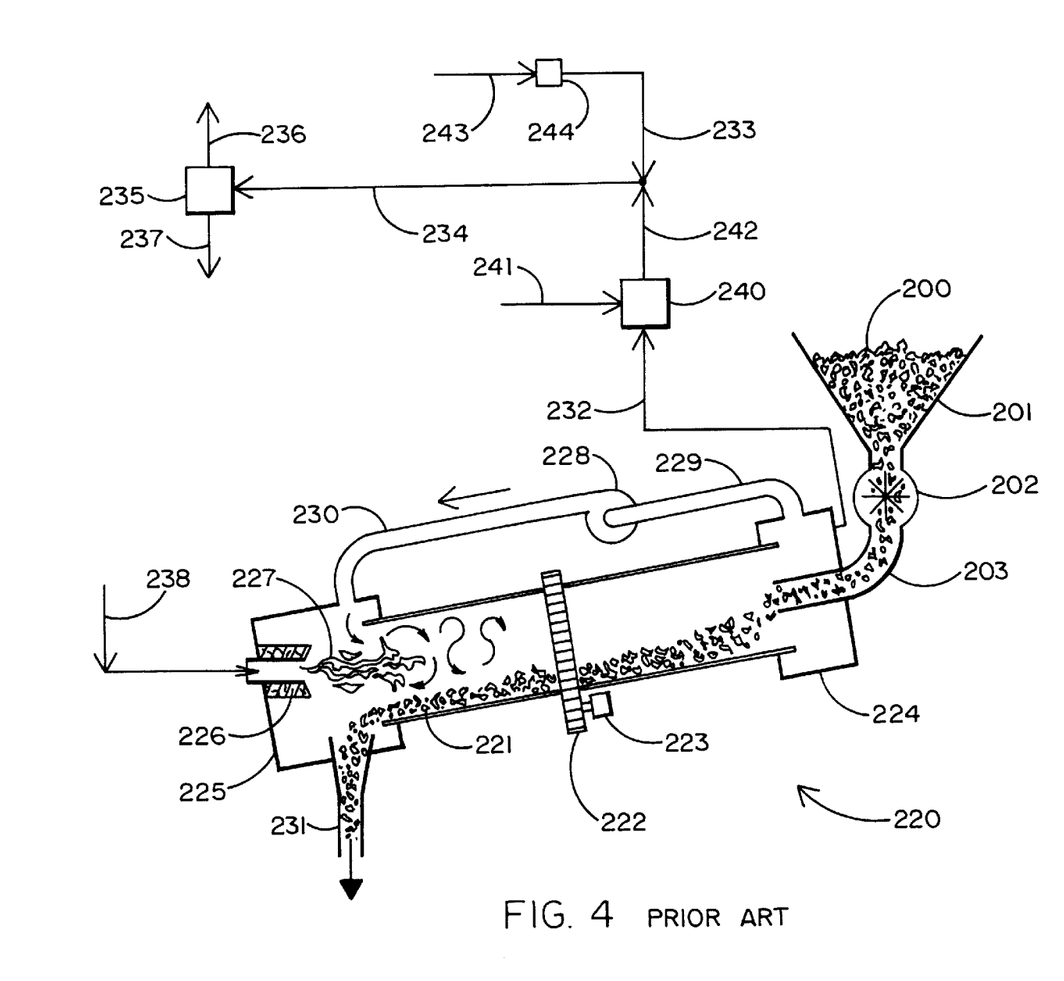
FIG. 4 is a schematic of a conventional rotary kiln apparatus for decarbonizing aluminum scrap.

FIG. 4 illustrates a conventional retort process for decarbonizing aluminum scrap in which aluminum scrap 20 is charged to rotary kiln 220 through hopper 201, star valve 202 and conduit 203. Rotary kiln 220 has a rotating drum 221 rotated by gear drive 222 which is powered by motor 223. Non-rotating plenum chambers 224 and 225 permit drum 221 to rotate freely while deterring leakage between the drum and plenum chambers.

Chamber 225 has a nozzle 226 for holding flame 227 produced by burning of fuel and combustion air fed through line 238 into plenum 225. Hot combustion gases are recycled through rotating drum 221 by fan 228 which is connected to chambers 224 and 225 by conduits 229 and 230, respectively. Flame 227 has a temperature of from about 2300° F. to about 2400° F. Chambers 224 and 225, rotating drum 221, and conduit 229 and 230 have a temperature of about 1000° F. Chamber 225 also has outlet 231 through which decarbonized aluminum scrap is discharged at a temperature of about 800° F.

A hot dust laden vent gas removed through line 232, and burned in afterburner 240 at a temperature of about 1600° F. with fuel and combustion air entering through line 241. A hot product gas at about 1600° F. is removed from afterburner 240 through line 242 and cooled by mixing and greatly diluting with ambient air. The ambient air enters through line 243 and is blown by fan 244 into line 233 where it mixes with the hot gases from line 242 to form cooler dust laden stream 234. Sufficient ambient air must be used to reduce the temperature of mixed stream 234 to no more than about 400° F. The dust in stream 234 is separated from the gas in bag house 235, with the gas vented through line 236 to the environment, and the dust removed through line 237. The temperature of stream 234 must be low enough to not damage the fabric of the bags in bag house 235. Generally the upper temperature permitted for stream 234 is about 400° F.

Some of the disadvantages of using rotary kiln processes for decarbonizing aluminum scrap are as follows. Since the oxygen content in rotating drum 221 is usually about 8%, substantial oxidation of the aluminum scrap occurs, which results in aluminum yield loss to dross of about 9% when melted in the aluminum melter. Dross is that portion of floating layer of aluminum oxides and other contaminants which float on the surface of the molten aluminum metal in the melter which is skimmed off the surface of the molten metal and if used has greatly reduced value compared to the metal.

Furthermore, afterburner 240 is energy intensive and maintenance of baghouse 235 is labor intensive both of which are not required in the decarbonization process of this invention.

The reduction in aluminum yield loss from 9% to 5% represents a savings of about $4.00 per 100 lbs. of aluminum produced from aluminum scrap. Since large plants produce between 10 to 15 million lbs. of aluminum from aluminum scrap per month, the savings just on reducing dross from 9% to 5% alone is estimated to produce added profits of from $400,000 to $600,000 per month.

Additionally, since there is a positive pressure of about 1 to about 3 inches or more of water in the rotary kiln, there are substantial fugitive emissions which pollute the environment.

Therefore, there is a need for a decarbonizing process which reduces the loss of aluminum yield due to dross and for a process which reduces fugitive emissions.

SUMMARY OF THE INVENTION

This invention allows increased aluminum yield to be achieved by reducing losses due to dross thereby conserving the country's aluminum reserves, reducing energy cost to process aluminum scrap, and reduces the amount of fugitive emissions to the environment for decarbonizing aluminum scrap.

This invention is directed towards a process for recovering aluminum scrap to be used as feed to an aluminum melter and in particular to processes for producing cleaned and decarbonized aluminum scrap. The cleaned and decarbonized aluminum scrap when subsequently melted in an aluminum melter has less lost of aluminum to dross and a higher aluminum yield. The decarbonization process of this invention can be conducted at slightly negative gauge pressures thereby greatly reducing fugitive emissions to the environment.

The decarbonization process of this invention does not require burning of carbon-containing coatings on the aluminum scrap to remove such coatings from the aluminum scrap. In this invention hot oxidizing furnace environments are not required nor used to decarbonize the aluminum scrap. Hot oxidizing environments not only combust the carbon-containing coating but also unfortunately oxidize some of the aluminum which causes more dross to be produced during the subsequent melting of the aluminum scrap to produce aluminum. Lost of aluminum to dross formation reduces the yield of aluminum and is a very undesirable and costly consequence.

Furthermore, hot oxidizing furnaces, which are not operated at negative gauge pressures, are well known to generate fugitive emissions to the environments.

Accordingly, there is provided by the principles of this invention a process for recovering aluminum from aluminum scrap containing a carbon-containing coating. In one embodiment of this invention, the aluminum scrap is used aluminum cans, painted Venetian blind slats, and MLC's. "MLC" means "mixed low copper" and is a term used in the trade that refers to aluminum alloys which have a low percentage of copper. For example, the aluminum content of MLC's is at least 90% and for most MLC's 97% or more. In another embodiment, the carbon-containing coating is selected from the group consisting of organic compounds, lacquers, varnishes, celluloses, cellulose derivatives, paints and mixtures thereof.

The aluminum scrap is treated with hot water to remove hot water removable contaminants therefrom thereby producing a treated or cleaned aluminum scrap. In an essentially combustion-product-gas free environment, the carbon-containing coating on the treated aluminum scrap is volatilized with superheated steam thereby producing a decarbonized aluminum scrap and a gaseous mixture which comprises a carbon-containing volatile produced from the carbon-containing coating and spent steam.

The carbon-containing volatile is separated from the gaseous mixture and decarbonized aluminum scrap and formed into a stream which is essentially combustion-product-gas free, and the decarbonized aluminum scrap is recovered without the necessity of having been exposed to a combustion product gas during its decarbonization and without having the carbon-containing coating while on the aluminum scrap combusted in a hot furnace.

There is also provided by the principles of this invention a process to increase the aluminum yield from aluminum scrap by minimizing oxidation of aluminum content of the aluminum scrap prior to treating it with the hot water, thereby decreasing the lost of aluminum to dross during the subsequent melting of the decarbonized aluminum scrap to produce aluminum.

In one embodiment, the treating of the aluminum scrap with hot water and the volatilizing of the carbon-containing coating with the superheated steam are conducted at slightly negative gauge pressures. In a preferred embodiment, the negative gauge pressure is from about 1 to about 3 inches of water.

In a further embodiment, entry of ambient air into the process at aluminum scrap entry point and/or at decarbonized aluminum scrap removal point is minimized. In one embodiment, this is achieved by introducing the aluminum scrap through a water seal into the process before the treating of the aluminum scrap with hot water. In another embodiment, this is achieved by recovering the decarbonized aluminum scrap through a water seal, or alternatively by recovering the decarbonized aluminum scrap through a mechanical separator which minimizes entry of ambient air into the process at decarbonized aluminum scrap removal point. An example of a mechanical separator is a star valve.

In one embodiment, the hot water has a temperature from about 200° F. to about 212° F. In one embodiment, the superheated steam has a temperature from about 900° F. to about 1100° F.

In one embodiment, the process is a continuous flow process and the superheated steam and the aluminum scrap flow countercurrently to each other.

In a further embodiment, the hot water is filtered to remove contaminants and the treated aluminum scrap is rinsed with the filtered hot water before the volatilizing the carbon-containing coating. In still another embodiment, the process is a continuous flow process and the filtered hot water used for rinsing the aluminum scrap and the aluminum scrap flow countercurrently to each other.

In one embodiment, the process further comprising cooling and filtering the hot water to remove contaminants therein, thereby producing a filtered warm water, and forming a condensate from the spent steam in the gaseous mixture by contacting the gaseous mixture with the filtered warm water. In another embodiment, the filtered warm water has a temperature from about 110° F. to about 150° F., and in a preferred embodiment about 130° F. In a further embodiment, the process is a continuous flow process and the filtered warm water and the aluminum scrap flow countercurrently to each other. In another embodiment, the condensate is separated from the carbon-containing volatile in the gaseous mixture, and the condensate is used as the hot water for the treating of the aluminum scrap in the wash zone.

In one embodiment, the process further comprises combusting the carbon-containing volatile in the stream, and venting the combusted carbon-containing coating to the environment. In a still further embodiment, the hot combustion stream is used in a heat exchanger to heat indirectly a water stream of the process and/or to dry the decarbonized aluminum scrap.

In one embodiment, the process includes melting the decarbonized aluminum scrap and producing aluminum therefrom. In another embodiment, the decarbonized aluminum scrap is fed directly into the aluminum melter. In a further embodiment, the rate of feed of the aluminum scrap into the hot water wash is controlled to correspond to rate of feed required for the decarbonized aluminum scrap to the aluminum melter.

In another embodiment, the oxidation of aluminum content of the decarbonized aluminum scrap is minimized prior to melting it, thereby subsequently minimizing the amount of dross formed and increasing aluminum yield from the aluminum melter.

There is also provided by the principles of this invention a process for recovering aluminum from aluminum scrap which contains a carbon-containing coating comprising washing the aluminum scrap with hot water in a wash zone to remove hot water removable contaminants from the aluminum scrap thereby producing a treated aluminum scrap. Thereafter, in an essentially combustion-product-gas free environment, volatilizing the carbon-containing coating on the treated aluminum scrap with superheated steam in a volatilizing zone thereby producing a decarbonized aluminum scrap and a gaseous mixture which comprises a carbon-containing volatile produced from the carbon-containing coating and spent steam.

The process includes cooling and filtering the hot water removed from the wash zone in a cooling-filtering zone to remove contaminants thereby producing a filtered warm water, and forming a condensate from the spent steam in the gaseous mixture by contacting it with the filtered warm water in a condensing zone. The condensate is separated from the carbon-containing volatile in a gas-liquid separation zone, and the separated condensate from the gas-liquid separation zone is recycled to the wash zone as the hot water for washing the aluminum scrap.

The carbon-containing volatile is separated in the gas-liquid separation zone into a stream which is essentially combustion-product-gas free, and the decarbonized aluminum scrap is recovered from the volatilizing zone and used as a feed to an aluminum melter.

DESCRIPTION OF THE PREFERRED EMBODIMENTS

A conventional process for preparing used beverage cans or "UBC" and other aluminum scrap included with UBC scrap comprises compacting the UBC into briquettes approximately 1 cubic foot in size weighing about 35 lbs. or into bales approximately 3.5 cubic yards in size weighing about 1700 lbs. for easy of shipment to the processing site. Other aluminum scrap such as painted Venetian blind slats and MLC's are also often included in the briquettes or bales.

After arrival at the processing site, the briquettes or bales shredded are into small strips from about 0.1 to about 0.3 inches in width. The shredded UBC is fed to an air knife which separates it into a first stream comprising plastic, paper and the like, a second stream comprising heavy material such as lead, and a third stream comprising the aluminum component of the UBC. The third stream is passed through a magnetic separator to remove iron and other magnetic materials, and the remainder, which contains most of the aluminum component of the UBC, still contains dirt, beverage residue such as syrups, beer, juices and other food residues, and carbon-containing coatings such as organic compounds, lacquers, varnishes, celluloses, cellulose derivatives, paints This portion is then used as the preferred aluminum scrap feed 20 to the decarbonization processes. Other aluminum scrap feed stock can be used however.

Figure 1:
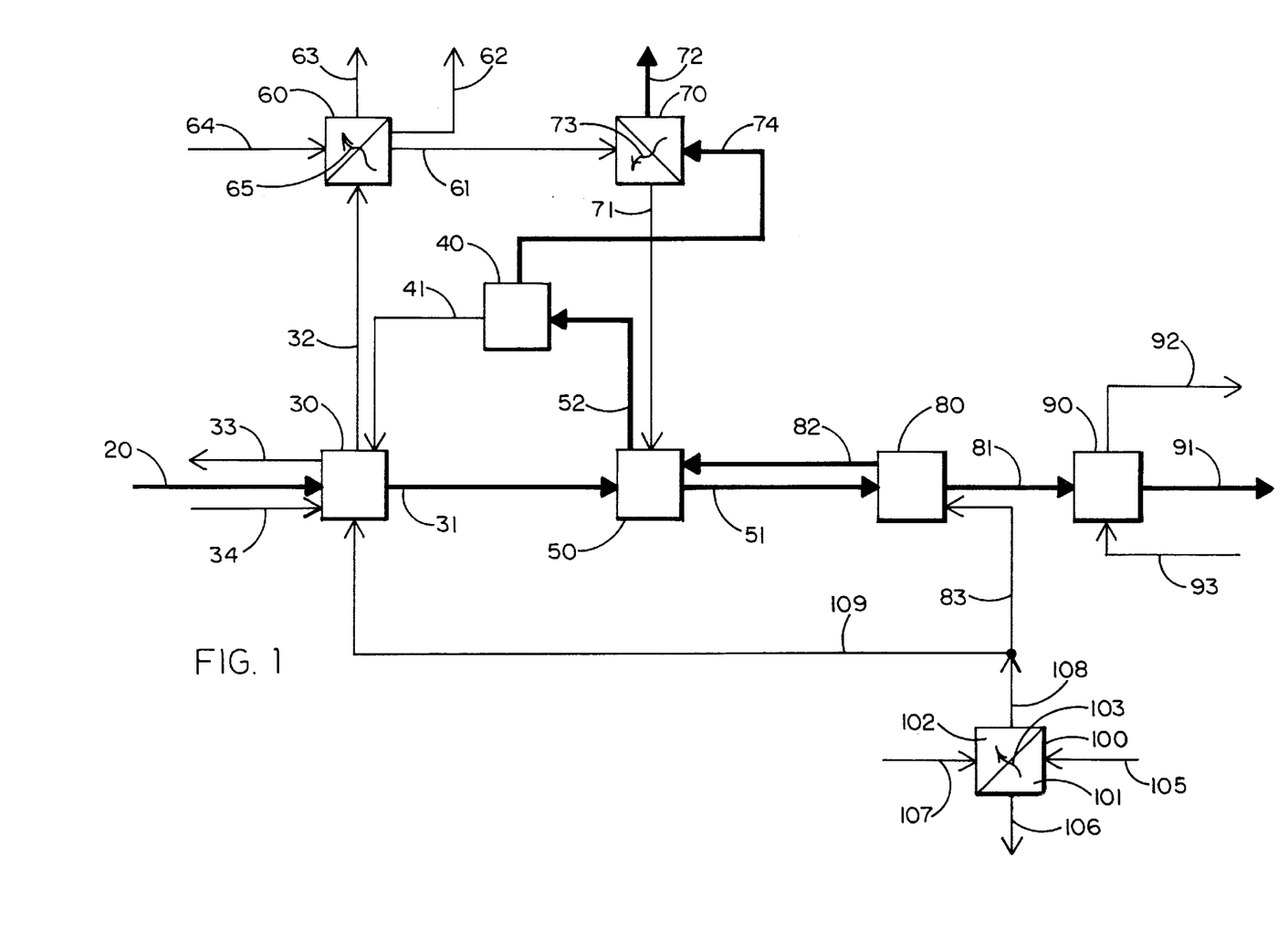
FIG. 1 is a flow diagram of a process for decarbonizing aluminum scrap of this invention.

FIG. 1 is a flow diagram of one embodiment of this invention. In this embodiment aluminum scrap 20 is charged to hot water wash zone 30, preferably under a water seal, to remove hot water removable contaminants from the aluminum scrap. Hot water wash zone is maintained at a temperature no more than a few degrees below 212° F., and preferably at the bath boiling temperature. Branched line 109 supplies a regulated flow of superheated steam effective for maintaining zone 30 at the desired hot water temperature. Line 109 also provides start-up steam to heat the hot water wash zone 30 to operating temperature.

Evaporation losses from hot water wash zone 30 are represented by line 33. Make-up water is added to hot water wash zone 30 through line 34 as required to replace the evaporation losses. The washed aluminum scrap is separated and removed from zone 30 through line 31 and fed into condensing zone 50.

A portion of the contaminated hot water is removed from hot water wash zone 30 and fed through line 32 into cooling zone 60 in which filterable contaminants are removed through line 62 and warm water filtrate through line 61. In one embodiment, the temperature of the filtrate is about 130° F. Coolant air entering cooling zone 60 through line 64 is discharged to the environment through line 63. Arrow 65 represents the direction of the transfer of heat across cooling zone 60. The waste heat carried by the coolant air in line 63 is not recovered.

The filtered warm water in line 61 is heated slightly in vent condenser zone 70 by a hot heat transfer fluid which enters through line 74 and exits through line 72. The composition of the hot heat transfer fluid is described below. Arrow 73 represents the direction of the transfer of heat across vent condenser zone 70. The slightly warmer water Filtrate is removed from vent condenser zone 70 through line 71 and fed into condensing zone 50 wherein it contacts directly spent and contaminated superheated steam entering through line 82, thereby causing condensation of the steam The temperature of the filtrate leaving condensing zone 50 is about 1° F. to about 3° F. higher than it was when it entered zone 50.

The warm aluminum scrap is separated and removed from condensing zone 50 and fed through line 51 into decarbonizing zone 80 where it is contacted with superheated steam entering through branched line 83. The superheated steam volatilizes the carbon-containing coatings on the aluminum scrap thereby producing carbon-containing volatiles and a spent superheated steam gaseous mixture. Examples of carbon-containing coatings are organic compounds, lacquers, varnishes, celluloses, cellulose derivatives, paints and mixtures thereof. In one embodiment, the temperature of the superheated steam is from about 900° F. to about 1100° F.

The gaseous mixture is separated from the decarbonized aluminum scrap and fed through line 82 into condensing zone 50 where it is condensed as previously explained. In one embodiment, the temperature of condensing zone 50 is from about 210° F. to about 212° F. The condensate and remaining gaseous mixture are separated from the aluminum scrap and fed through line 52 into gas-liquid separation zone 40. The condensate is separated from the remaining gaseous mixture in zone 40 and recycled to hot water wash zone 30 through line 41, and the remaining gaseous mixture, which contains the carbon-containing volatiles, is fed through line 74 into vent condenser zone 70 as the previously mentioned hot heat transfer fluid for heating the warm water filtrate entering through line 61.

The decarbonized aluminum scrap is removed from decarbonizing zone 80 through line 81 and fed to water seal zone 90 which permits the decarbonized aluminum scrap to be removed in product stream 91 without allowing air to enter the process through water seal zone 90. Evaporation losses from water seal zone 90 are represented by line 92. Make-up water is added to zone 90 through line 93.

The superheated steam for the process is produced by boiler 100. Boiler 100 has furnace section 101 and steam generating section 102. Boiler feed water entering through line 107 is vaporized in section 102 and the raised superheated steam is fed to the process through line 108.

Fuel and combustion air enter furnace section 101 through line 105 and boiler combustion products are discharged through line 106. Arrow 103 represents the direction of the transfer of heat in the boiler. The hot combustion products in line 106 are not used to decarbonized the aluminum scrap, however, they can be used to dry the decarbonized aluminum scrap as it is removed from water seal zone 90 in line 91 before the decarbonized aluminum scrap is charged to an aluminum melter. If desired, line 91 can be discharged directly to the aluminum melter.

The carbon-containing volatiles in line 72 can be burned in any manner desired including combustion in furnace section 101 of boiler 100 in a stand-alone process, or made a part of the fuel to the aluminum melter, or in an afterburner.

Figure 3:
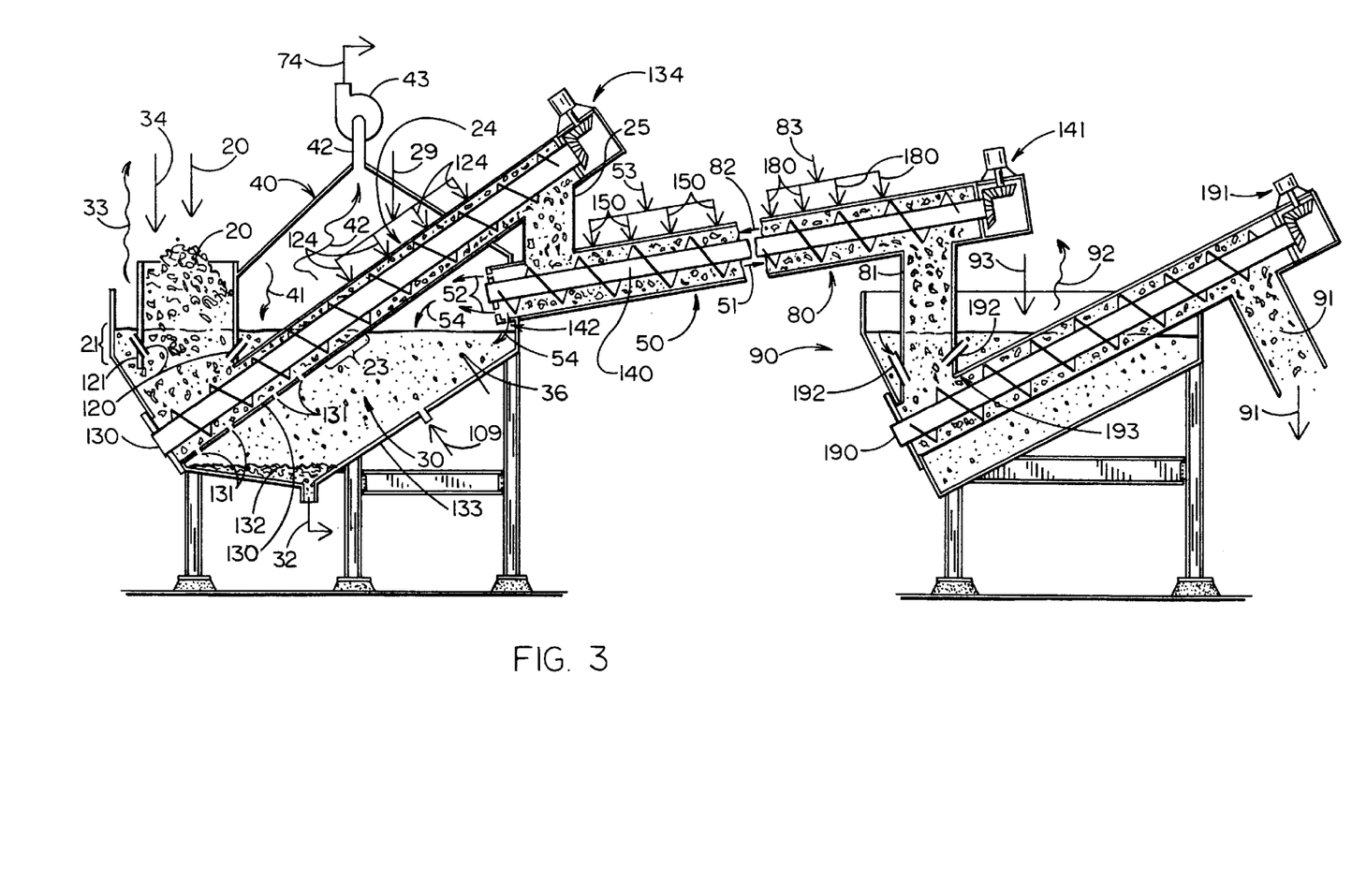
FIG. 3 is a schematic of an apparatus for decarbonizing aluminum scrap.

Feeding the aluminum scrap into hot water wash zone 30 through a water seal and removing the decarbonized aluminum scrap through water seal 90 allows the process of this invention to operate at a slightly negative gauge pressure. For example, in one embodiment a negative pressure of about 1 to about 3 inches of water is maintained. Operation of the decarbonization process at a negative gauge pressure prevents leakage of contaminants from the process out into the environment. This is one of the environmental advantages of this invention. One type of water seal is shown in FIG. 3.

Figure 2:
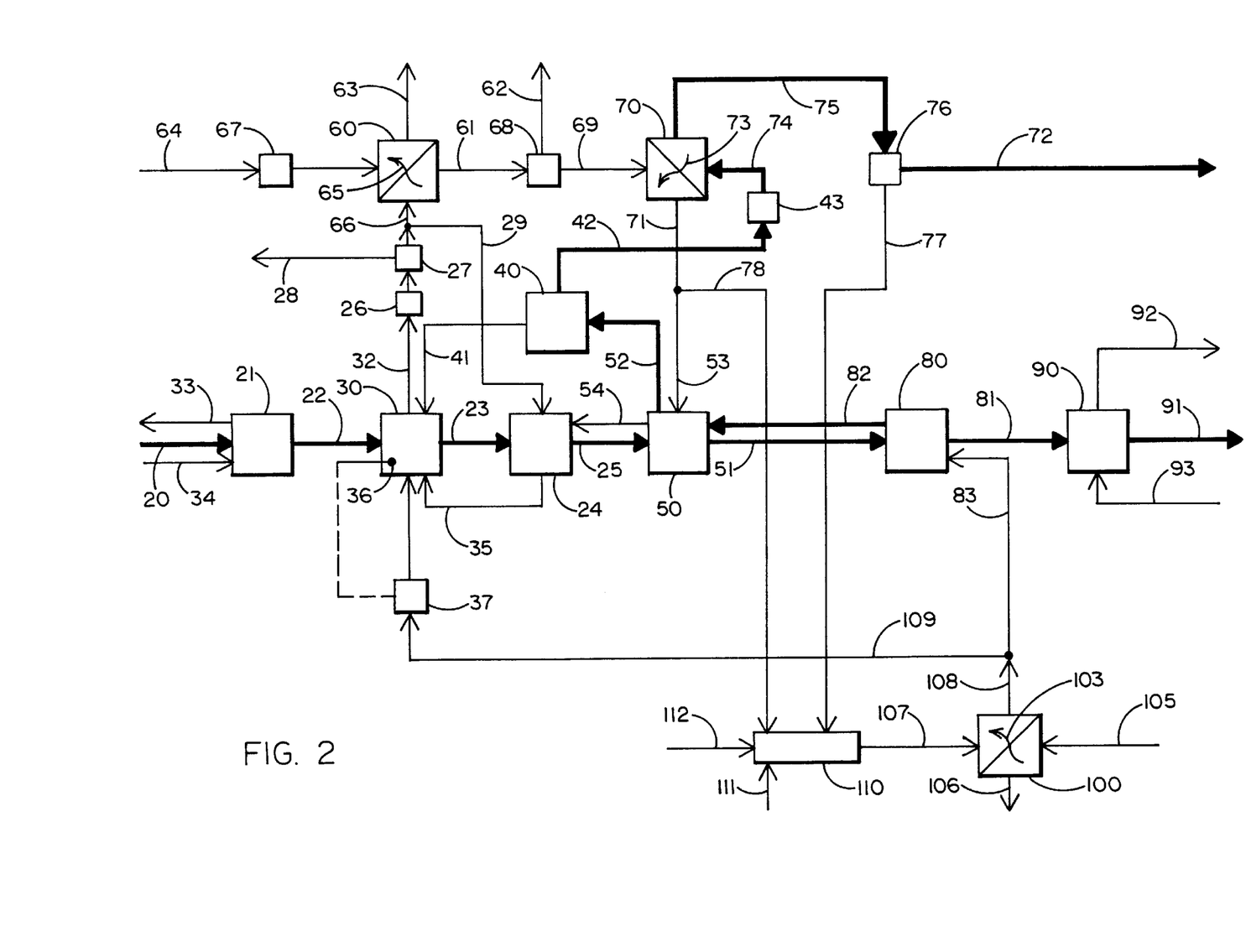
FIG. 2 is a flow diagram of another embodiment of this invention for decarbonizing aluminum scrap.

FIG. 2 is a flow diagram of another embodiment of this invention. In this embodiment, aluminum scrap 20 is first fed into water seal 21 and from there fed through line 22 into hot water wash zone 30. The aluminum scrap is fed from zone 30 through line 23 into another hot water wash or rinse zone 24 and from there through line 25 into condensing zone 50. A portion of the hot water is removed from hot water wash zone 30 through line 32 and pumped by pump 26 through strainer 27 to remove solid contaminants separated from the aluminum scrap in wash zone 30. The solid contaminants are discharged in line 28, and a portion of the hot water is pumped through branched line 29 into hot water wash or rinse zone 24 where the aluminum scrap is again washed or rinsed. Solid contaminants from zone 24 are fed back to zone 30 through line 35. In one embodiment, some condensate from condensing zone 50 is fed directly through line 54 into hot water wash or rinse zone 24.

The remaining hot water from strainer 27 is pumped through line 66 into cooling zone 60. Cooling air 64 is forced by fan 67 through cooling zone 60 and discharged to the environment as vent air stream 63. The warm water removed in line 61 is filtered in filtering device 68 and the solid contaminants removed through line 62. The filtrate is removed from filtering device 68 and fed through line 69 into vent condenser zone 70.

The remaining gaseous mixture from gas-liquid separation zone 40, which contains the carbon-containing volatiles, is fed through line 42 by blower 43 and line 74 into vent condenser zone 70 as the hot heat transfer fluid for heating the warm water filtrate entering through line 69. The cooled vent stream is removed from zone 70 through line 75 and newly formed water condensate is separated from the remaining gases in auxiliary gas-liquid separation zone 76. The carbon-containing volatiles in line 72 are processed as described with reference to FIG. 1. The water condensate separated in zone 76 is fed through line 77 into condensate tank 110.

Most of the condensate in line 71 is recycled to condensing zone 50 through branched line 53, however, a small portion is fed to tank 110 through branched line 78.

City or raw water is fed through line 111 into tank 110 along with boiler feed water chemicals through line 112. The required boiler feed water is fed from tank 110 and charged to boiler 100 through line 107.

The temperature in hot water wash zone 30 is sensed by thermocouple 36 which signals controller 37 which regulates the flow of superheated steam into wash zone 30 required to maintain the desired hot water temperature.

With regard to FIG. 2, the following illustrates some mass flows and heat flows at various locations in FIG. 2, where T=temperature in °F., p =pressure in psia, w=mass flow in lbs/hr, h=enthalpy in BTU/lb for various L/Z (lines or zones), Q=heat added in BTU/hr, and NM=not meaningful.

| L/Z | T | p | w | h | Q |
| --- | --- | --- | --- | --- | --- |
| 20 | 70 | 14.7 | 5000 | 15 | NM |
| 23 | 200 | 14.6 | 4900 | 44 | NM |
| 30 | 212 | 14.6 | NM | 180 | NM |
| 32 | 212 | 25 | 3000 | 180 | NM |
| 52 | 212 | 14.6 | 32500 | 180 | NM |
| 61 | 130 | 25 | 3000 | 98 | NM |
| 63 | NM | NM | NM | NM | −2460000 |
| 71 | 132 | 25 | 3000 | 100 | NM |
| 81 | 950 | 14.6 | 4700 | 209 | NM |
| 82 | 300 | 14.6 | 2500 | 1180 | NM |
| 90 | 212 | 14.7 | NM | 180 | NM |
| 91 | 200 | 14.7 | 4700 | 44 | NM |
| 108 | 1000 | 100 | 3000 | 1532 | NM |
| 109 | 1000 | 100 | 500 | 1532 | NM |

FIG. 3 is illustrative of one embodiment of this invention. Aluminum scrap 20 enters hot water wash zone 30 through water seal zone 21 and is conveyed by enclosed screw conveyor 130 through hot water wash zone 30. Around the periphery of water seal zone 21 is a plurality of downward sloping pipes 120 which insure that the hot water from zone 30 keeps zone 21 filled with water above bottom point 121 of zone 21. Screw conveyor 130, powered by drive and motor assembly 134, has screen openings 131 through which dirt and other small solid contaminants fall and collect as layer 132 in the bottom of tank 133. Superheated steam enters through line 109 in an amount sufficient to maintain the water in tank 133 at the desired temperature. Tank temperature is sensed by thermocouple 26. As the aluminum scrap is conveyed up the screw of screw conveyor 130 it passes through a hot water rinse zone 24 which contains a plurality of hot water nozzles 124 fed from line 29. A hot water spray injected through nozzles 124 washes solid contaminants down to the bottom of screw conveyor 130, countercurrent to the conveyance of the aluminum scrap, and down through screen 131. The solid contaminants are removed through line 32 in the bottom of tank 133. This stream is filtered and the solid contaminants removed and the filtrate recycled.

As the washed and rinsed aluminum scrap reaches the top of screw conveyor 130 it drops through conduit 25 into the feed section of enclosed screw conveyor 140 whereupon the aluminum scrap is conveyed first through condensing zone 50 and then through decarbonizing zone 80. Screw conveyor 140 is powered by drive and motor assembly 141. The aluminum scrap is contacted with superheated steam injected through a plurality of nozzles 180 in the upper portion of screw conveyor 140. Nozzles 180 receive the superheated steam through inlet line 83. The injected steam decarbonizes the aluminum scrap and produces carbon-containing volatiles and decarbonized aluminum scrap. The decarbonized aluminum scrap is discharged through conduit 81 into water seal zone 90.

Spent and contaminated steam, containing the carbon-containing volatiles, flow countercurrently, as indicated by arrow 82, to the flow of aluminum scrap, as indicated by arrow 51. The spent steam is condensed by a warm water spray entering through nozzles 150 which are fed by line 53. The condensate produced from the steam, the spray water and the carbon-containing volatiles flow countercurrently to the aluminum scrap. Some of the condensate flows through screen 142 in the lower end of screw conveyor 140 directly into the hot water wash zone 30 as indicated by arrow 54. Entrained condensate and gases containing the carbon-containing volatiles flow into gas-liquid separation zone 40 as indicated by arrows 52 and separate therein into coalescing liquid droplets 41 and rising gaseous stream 42. Gaseous stream 42, which contains the carbon-containing volatiles, is pulled up through conduit 42 by blower 43 and blown into line 74.

Conduit 81 feeds the decarbonized aluminum scrap into the feed section of screw conveyor 190 of water seal zone 90. Screw conveyor 190, powered by drive and motor assembly 191, conveys the decarbonized aluminum scrap to the top of the screw whereupon the aluminum scrap is discharged through conduit 91, preferably directly into an aluminum melter. Evaporative losses are represented by arrow 92. Make-up water for replacing evaporative losses is add through line 93. Around the periphery of conduit 81 as it protrudes into water seal zone 90 is a plurality of downward slopping pipes 192 which insure that the hot water from zone 90 keeps the bottom portion of conduit 81 filled with water above bottom 193 thereof.

The disadvantages of using rotary kiln processes for decarbonizing aluminum scrap were mentioned earlier. Briefly they are substantial oxidation of the aluminum scrap which results in aluminum yield loss of about 9% to dross when melted in the aluminum melter, whereas in the decarbonization process of this invention aluminum yield loss to dross is estimated to be about 5%.

Furthermore, afterburner 240 in the rotary kiln process of FIG. 4 is energy intensive and maintenance of baghouse 235 is labor intensive both of which are not required in the decarbonization process of this invention.

The substantial fugitive emissions which pollute the environment due to the positive pressure in the rotary kiln do not occur in the decarbonization process of this invention, which is operated at a slightly negative gauge pressure.

While the preferred embodiments of the present invention have been described, it should be understood that various changes, adaptations and modifications may be made thereto without departing from the spirit of the invention and the scope of the appended claims. It should be understood, therefore, that the invention is not to be limited to minor details of the illustrated invention shown in preferred embodiment and the figures, and that variations in such minor details will be apparent to one skilled in the art.

Therefore it is to be understood that the present disclosure and embodiments of this invention described herein are for purposes of illustration and example and that modifications and improvements may be made thereto without departing from the spirit of the invention or from the scope of the claims. The claims, therefore, are to be accorded a range of equivalents commensurate in scope with the advances made over the art.

What is claimed is:

1. A process for recovering aluminum from aluminum scrap which contains a carbon-containing coating comprising:

(a) treating aluminum scrap which contains a carbon-containing coating with hot water to remove hot water removable contaminants from the aluminum scrap thereby producing a treated aluminum scrap;

(b) in an essentially combustion-product-gas free environment, volatilizing the carbon-containing coating on the treated aluminum scrap with superheated steam thereby producing a decarbonized aluminum scrap and a gaseous mixture which comprises a carbon-containing volatile produced from the carbon-containing coating and spent steam;

(c) separating the carbon-containing volatile from the gaseous mixture and decarbonized aluminum scrap into a stream which is essentially combustion-product-gas free; and (d) recovering the decarbonized aluminum scrap.

2. The process of claim 1, wherein the treating of the aluminum scrap with hot water and the volatilizing of the carbon-containing coating with the superheated steam are conducted at negative gauge pressures.

3. The process of claim 1, wherein the process is a continuous flow process and wherein the superheated steam and the treated aluminum scrap flow countercurrently to each other.

4. The process of claim 1, further comprising minimizing entry of ambient air into the process at aluminum scrap entry to the process and at decarbonized aluminum scrap removal from the process.

5. The process of claim 1, further comprising introducing the aluminum scrap through a water seal into the process before the treating of the aluminum scrap with hot water.

6. The process of claim 1, wherein the hot water has a temperature from about 200° F. to about 212° F., and the superheated steam has a temperature from about 900° F. to about 1100° F.

7. The process of claim 1, wherein the recovery of the decarbonized aluminum scrap is through a water seal.

8. The process of claim 1, further comprising filtering the hot water to remove contaminants thereby producing a filtered hot water; and rinsing the treated aluminum scrap with the filtered hot water and before the volatilizing of the carbon-containing coating.

9. The process of claim 8, wherein the process is a continuous flow process and wherein the filtered hot water and the treated aluminum scrap flow countercurrently to each other.

10. The process of claim 1, further comprising cooling and filtering the hot water to remove contaminants thereby producing a filtered warm water; and forming a condensate from the spent steam in the gaseous mixture by contacting the gaseous mixture with the filtered warm water.

11. The process of claim 10, wherein the process is a continuous flow process and wherein the filtered warm water and the treated aluminum scrap flow countercurrently to each other.

12. The process of claim 10, further comprising separating and using the condensate as the hot water for the treating of the aluminum scrap.

13. The process of claim 1 further comprising combusting the carbon-containing volatile in the stream, and venting the combusted stream to the environment.

14. The process of claim 1, further comprising minimizing oxidation of aluminum content of the aluminum scrap prior to treating it with the hot water.

15. The process of claim 1, further comprising minimizing oxidation of aluminum content of the decarbonized aluminum scrap prior to melting it.

16. A process for recovering aluminum from aluminum scrap which contains a carbon-containing coating comprising:

(a) washing aluminum scrap which contains a carbon-containing coating with hot water in a wash zone to remove hot water removable contaminants from the aluminum scrap thereby producing a treated aluminum scrap;

(b) in an essentially combustion-product-gas free environment, volatilizing the carbon-containing coating on the treated aluminum scrap by contacting with superheated steam in a volatilizing zone thereby producing a decarbonized aluminum scrap and a gaseous mixture which comprises a carbon-containing volatile produced from the carbon-containing coating and spent steam;

(c) removing hot water from the wash zone and cooling and filtering the removed hot water in a cooling-filtering zone to remove contaminants thereby producing a filtered warm water;

(d) removing the gaseous mixture from the volatilizing zone and contacting the gaseous mixture with the filtered warm water in a condensing zone thereby forming a condensate from the spent steam in the gaseous mixture and a second gaseous mixture which contains the carbon-containing volatile;

(e) separating the condensate from the second gaseous mixture in a gas-liquid separation zone, and forming a condensate stream and a second gaseous stream which contains the carbon-containing volatile and which is also essentially combustion-product-gas free;

(f) recycling the condensate stream to the wash zone; and (g) recovering the decarbonized aluminum scrap from the volatilizing zone.

17. The process of claim 16, wherein the process is a continuous flow process and wherein the superheated steam and the treated aluminum scrap flow countercurrently to each other in the volatilizing zone.

18. The process of claim 17, wherein the filtered warm water and the treated aluminum scrap flow countercurrently to each other in the condensing zone.

19. The process of claim 16, further comprising removing and filtering in a filtering zone the hot water from the wash zone to remove contaminants thereby producing a filtered hot water; and rinsing the treated aluminum scrap from the wash zone with the filtered hot water in a rinsing zone, and using the rinsed aluminum scrap as the treated aluminum scrap contacted with the superheated steam in the volatilizing zone.

20. The process of claim 19, wherein the process is a continuous flow process, wherein the filtered hot water and the treated aluminum scrap flow countercurrently to each other in the rinsing zone;

wherein the filtered warm water and the rinsed aluminum scrap flow countercurrently to each other in the condensing zone; and wherein the superheated steam and the rinsed aluminum scrap flow countercurrently to each other in the volatilizing zone.

21. The process of claim 16, further comprising introducing the aluminum scrap through a water seal before washing the aluminum scrap in the wash zone, and wherein the recovery of the separated decarbonized aluminum scrap from the volatilizing zone is through a water seal.

\* \* \* \* \*